US011208191B2

(12) United States Patent
Kennan

(10) Patent No.: US 11,208,191 B2
(45) Date of Patent: Dec. 28, 2021

(54) FLIGHT TERMINATION SYSTEM FOR TETHERED AERIAL VEHICLES

(71) Applicant: Aerostar International, Inc., Sioux Falls, SD (US)

(72) Inventor: Michael Kennan, Oakland, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 161 days.

(21) Appl. No.: 16/553,433

(22) Filed: Aug. 28, 2019

(65) Prior Publication Data

US 2021/0061435 A1 Mar. 4, 2021

(51) Int. Cl.
| | | |
|---|---|---|
| *B64B 1/46* | (2006.01) | |
| *B64B 1/50* | (2006.01) | |
| *G05D 1/10* | (2006.01) | |

(52) U.S. Cl.
CPC ............... *B64B 1/46* (2013.01); *B64B 1/50* (2013.01); *G05D 1/105* (2013.01)

(58) Field of Classification Search
CPC .... B64B 1/44; B64B 1/46; B64B 1/48; B64B 1/50; G05D 1/105
USPC ........................................................ 244/99
See application file for complete search history.

(56) References Cited

U.S. PATENT DOCUMENTS

| | | | | |
|---|---|---|---|---|
| 2,864,569 | A | * | 12/1958 | Froehlich ................. B64B 1/40 244/33 |
| 3,119,578 | A | * | 1/1964 | Borgeson ................. B64B 1/64 244/31 |
| 3,131,889 | A | * | 5/1964 | Yost ......................... B64B 1/40 244/31 |
| 9,139,278 | B1 | * | 9/2015 | Roach ...................... B64B 1/40 |
| 9,908,609 | B1 | * | 3/2018 | Fourie ...................... B64B 1/46 |
| 10,059,420 | B1 | * | 8/2018 | Hall-Snyder ............. B64B 1/46 |
| 2014/0012433 | A1 | * | 1/2014 | Vojtech .................... B64B 1/54 701/2 |
| 2017/0081011 | A1 | * | 3/2017 | Matthews ................ B64D 1/02 |
| 2017/0331177 | A1 | * | 11/2017 | MacCallum ............. B64B 1/40 |
| 2018/0334236 | A1 | | 11/2018 | Teller et al. |
| 2019/0152576 | A1 | | 5/2019 | Singer |

FOREIGN PATENT DOCUMENTS

CN 107244407 A 10/2017

* cited by examiner

*Primary Examiner* — Christopher D Hutchens
(74) *Attorney, Agent, or Firm* — Schwegman Lundberg & Woessner, P.A.

(57) ABSTRACT

Aspects of the disclosure relate to flight termination systems for tethered aerial vehicles having envelopes. For instance, a flight termination system may include a wire heating element arranged in a loop around the balloon envelope and connected to a strain relief connector, the strain relief connector, and an electrical cable connected to the strain relief connector. The electrical cable is configured to provide current to the wire in order to melt envelope material of the envelope and terminate a flight of the aerial vehicle.

18 Claims, 7 Drawing Sheets

FLIGHT TERMINATION SYSTEM FOR TETHERED AERIAL VEHICLES

BACKGROUND

Tethered aerial vehicles may be employed in various ways, including, for instance, testing features of high-altitude aerial vehicles, such as balloons, closer to the ground. For example, some systems may provide network access via a network including aerial vehicles. To maintain the network, each aerial vehicle may be required to be located at and/or to travel to a particular location, communicate with other aerial vehicles and ground stations, as well as provide network access. In order to ensure that an aerial vehicle will function properly when in use, for instance for testing purposes as noted above, an aerial vehicle may be tethered, or rather, attached to some object on the ground in order to limit their movement relative to the ground. At some point, when these serial vehicles need to be brought back to the ground, doing so quickly and as predictably as possible is critical.

BRIEF SUMMARY

Aspects of the present disclosure are advantageous for high altitude balloon systems. For instance, one aspect of the disclosure provides a system for a tethered aerial vehicle including an envelope. The system includes the envelope and a flight termination system. The flight termination system includes a wire heating element arranged in a loop around the envelope and connected to a strain relief connector, the strain relief connector, and an electrical cable connected to the strain relief connector. The electrical cable is configured to provide current to the wire in order to melt envelope material of the envelope and terminate a flight of the aerial vehicle.

In one example, the system also includes the aerial vehicle and the tether. In another example, the electrical cable is long enough to reach a power supply remote from the aerial vehicle. In this example, the system also includes the power supply, and the power supply is configured to provide less than 100 volts direct current to the electrical cable. In addition, the power supply is configured to provide no more than 48 volts direct current to the electrical cable. In addition or alternatively, the system also includes a control panel attached to the power supply, the control panel including a user input to enable an operator to activate the power supply and cause current to pass from the electrical cable to the wire. In addition or alternatively, the power supply is configured to automatically shut off once the power supply has been activated for a predetermined period of time. In this example, the predetermined period of time is 10 seconds or less. Alternatively, the predetermined period of time is at least 5 seconds. In another example, the system also includes lift gas arranged to cause the envelope material to open once the envelope material has been melted. In another example, the strain relief connector is attached to a top plate of the envelope. In another example, the strain relief connector is attached to a bottom plate of the envelope. In another example, the strain relief connector is configured to keep the wire attached to the envelope during termination of the flight of the aerial vehicle. In addition, the wire is secured to the envelope via one or more tack points. In another example, the system also includes an additional piece of envelope material arranged over the wire and heat sealed to the envelope in order to secure the wire to the envelope.

Another aspect of the disclosure provides a method of terminating flight of a tethered aerial vehicle. The method includes activating a power supply in order to cause current to pass through an electrical cable; passing the current from the electrical cable to a wire looped around an envelope of the aerial vehicle via a strain relief device; using the current passed to the wire to melt envelope material of the envelope; and creating an opening in the melted envelope material in order to terminate the flight of the aerial vehicle.

In one example, the method also includes using the strain relief device to prevent the wire from separating from the aerial vehicle during the termination of the flight of the aerial vehicle. In this example, creating the opening includes using lift gas forces within the envelope to create the opening. In another example, activating the power supply includes doing so for a predetermined period of time. In another example, activating the power supply includes providing less than 100 volts to the electrical cable.

DETAILED DESCRIPTION

Overview

Figure 1:
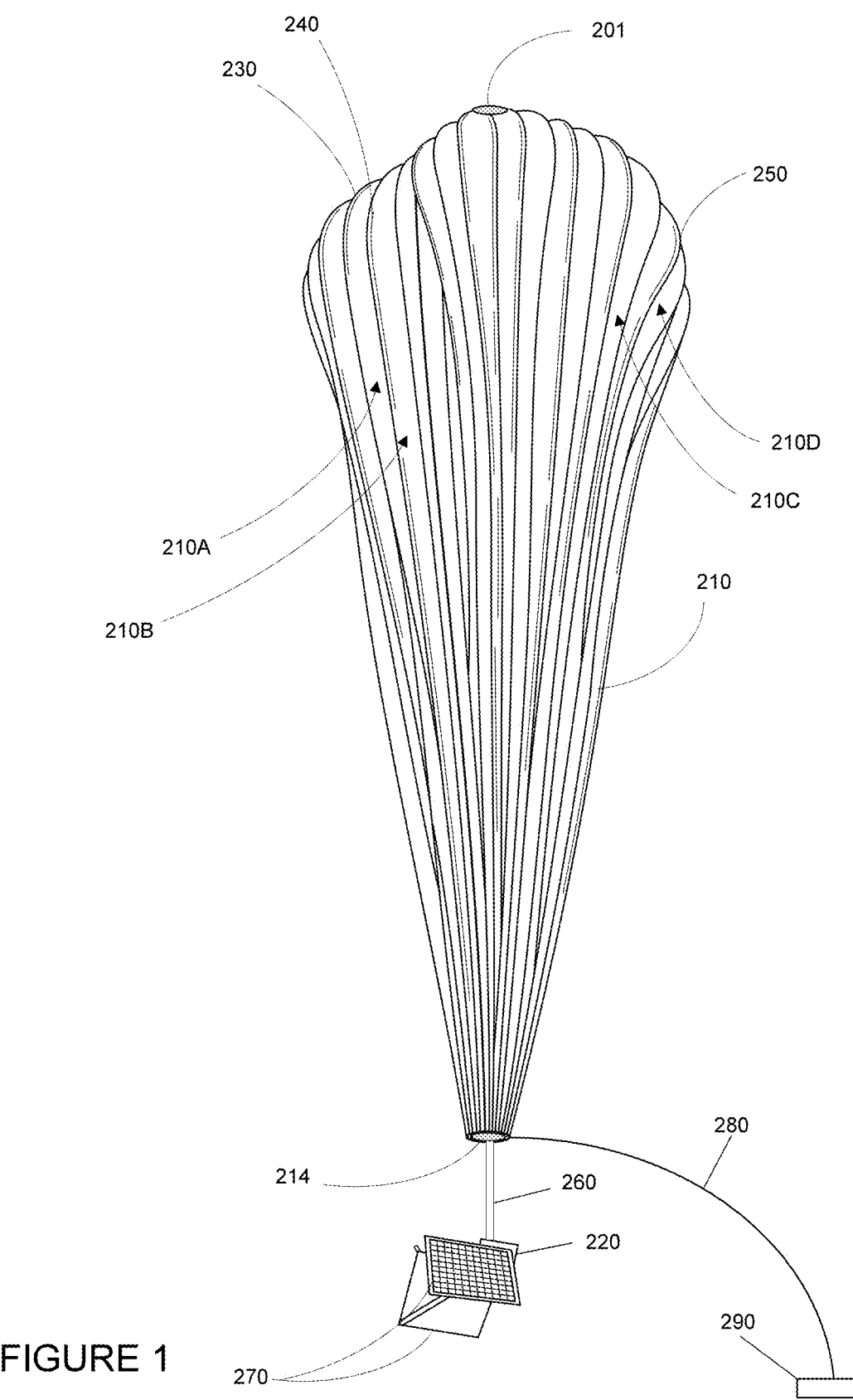
FIG. 1 is an example of an aerial vehicle in accordance with aspects of the present disclosure.

The present disclosure generally relates to providing system for terminating a flight of a tethered aerial vehicle having an envelope. Tethered aerial vehicles may be employed in various ways, including, for instance, testing features of high-altitude balloons closer to the ground. At some point, when these aerial vehicles need to be brought back to the ground, doing so quickly and as predictably as possible is critical. Current techniques may take as long as 30 minutes for an envelope to expel its gas, all the while the aerial vehicle may be flailing around in the wind. In addition, pulling on the tether to bring the aerial vehicle to ground level or a ground surface of the Earth may cause the aerial vehicle to twist and become unpredictable. The techniques and features described herein may allow a user on the ground to send a command to activate a flight termination system attached to the balloon that causes the balloon envelope to release its lift gas in a manner that allows the aerial vehicle to descend back to the ground surface.

The flight termination system may include a low resistance wire heating element. The wire may be attached to the envelope to enable heat from the wire to melt envelope material of the aerial vehicle. The configuration of the wire may define the shape of the opening. The wire may be attached to the envelope material in various ways.

The flight termination system may also include an electrical cable connected to both the wire and a power supply at ground level or on the ground surface. The electrical cable may be separate from the tether and several hundred feet long in order to reach a power supply on the ground surface. In order to prevent the weight of the electrical cable from pulling on the wire, the wire may be connected to the electrical cable via a strain relief connector attached to a top or base plate of the envelope.

The power supply may be controlled by a control panel. The control panel may include an input, such as a touch-sensitive display or a button, that enables the operator to activate the power supply. Activating the power supply may cause current to pass through the electrical cable, through the strain relief connector and to the wire. The low resistance characteristics of the wire may cause the wire to heat up and melt the envelope material. The force of the fluid on the interior of the envelope on the melted envelope material may cause an opening in the envelope material through which lift gas may escape. At some point, enough lift gas will have escaped the envelope that the aerial vehicle will descend to the ground.

The features described herein may enable termination of a flight of a tethered aerial vehicle in a simple and effective way. Terminating the flight of a tethered aerial vehicle can have significant safety implications. However, because the power supply is low voltage and high current, operators are less likely to be exposed to electrical hazards. In addition, because the opening in the envelope is created quickly and lift gas is able to escape quickly, the aerial vehicle is more likely to fall to the ground immediately in a more predictable way which may minimize risk to other objects around the aerial vehicle.

Example Aerial Vehicle

Figure 2:
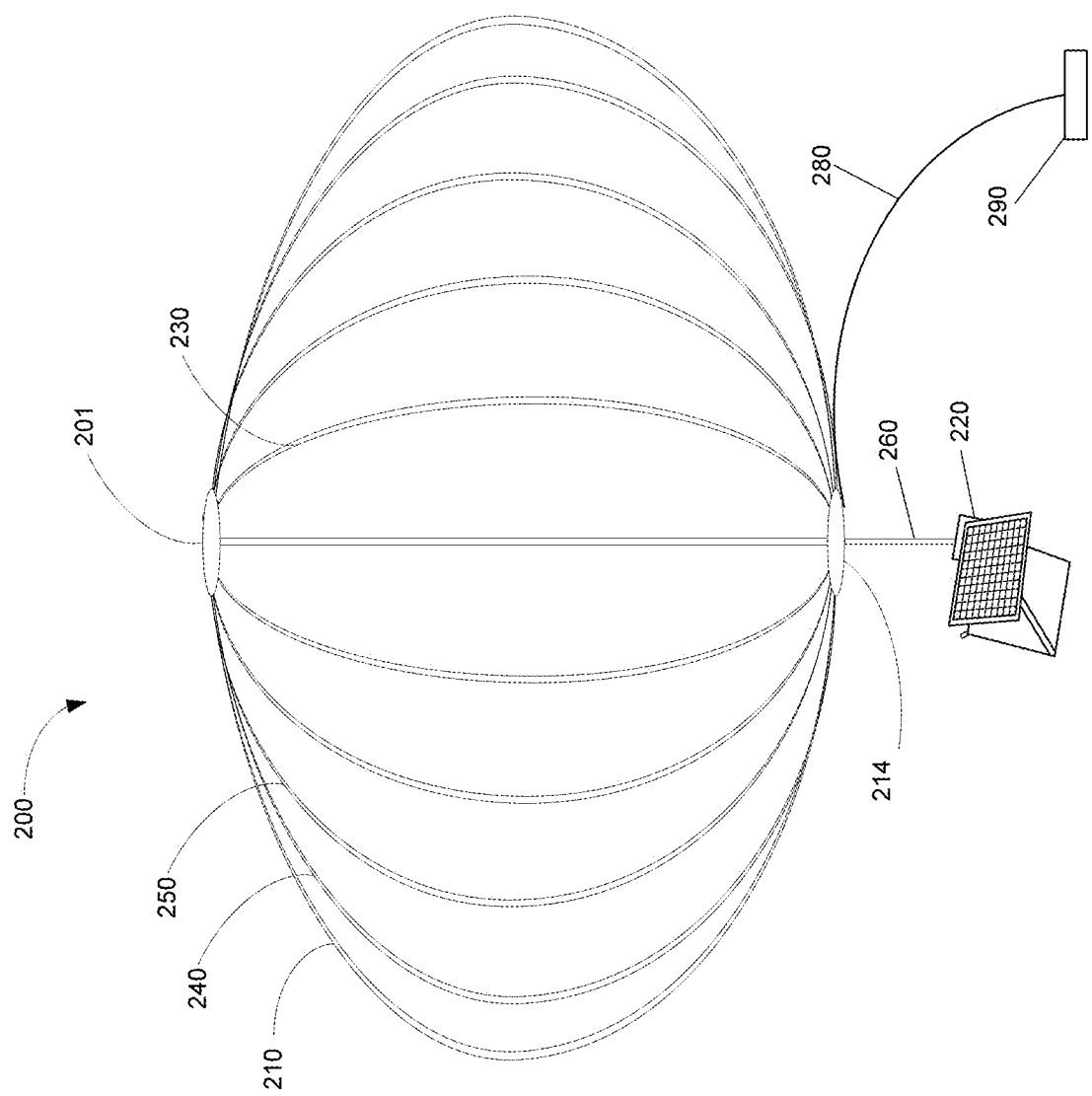
FIG. 2 is an example of an aerial vehicle in flight in accordance with aspects of the disclosure.

FIGS. 1 and 2 are examples of an aerial vehicle 200 which may be a balloon. For ease of understanding, the relative sizes of and distances between aspects of the aerial vehicle 200 and ground surface, etc. are not to scale. Of course, other aerial vehicles including envelopes may also be tested using tethers.

As shown, the aerial vehicle 200 includes an envelope 210, a payload 220 and a plurality of tendons 230, 240 and 250 attached to the envelope 210. The envelope 210 may take various forms. In one instance, the envelope 210 may be constructed from materials (i.e. envelope material) such as polyethylene that do not hold much load while the aerial vehicle 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of aerial vehicle 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include various communication systems such as optical and/or RF, a navigation software module, a positioning system, a lighting system, an altitude control system (configured to change an altitude of the aerial vehicle), a plurality of solar panels 270 for generating power, a power supply (such as one or more batteries) to store and supply power to various components of aerial vehicle 200.

In view of the goal of making the envelope 210 as lightweight as possible, it may be comprised of a plurality of envelope lobes or gores that have a thin film, such as polyethylene or polyethylene terephthalate, which is lightweight, yet has suitable strength properties for use as a envelope. In this example, envelope 210 is comprised of envelope gores 210A-210D.

Pressurized lift gas within the envelope 210 may cause a force or load to be applied to the aerial vehicle 200. In that regard, the tendons 230, 240, 250 provide strength to the aerial vehicle 200 to carry the load created by the pressurized gas within the envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of envelope 210. A corresponding apparatus, e.g., base plate or bottom plate 214, may be disposed at a base or bottom of the envelope 210. The top plate 201 at the apex may be the same size and shape as and bottom plate 214 at the bottom. Both caps include corresponding components for attaching the tendons 230, 240 and 250 to the envelope 210.

FIG. 2 is an example of aerial vehicle 200 in flight when the envelope 210 is pressurized. In this example, the shapes and sizes of the envelope 210, connection 260, and payload 220 are exaggerated for clarity and ease of understanding. During flight, these aerial vehicles may use changes in altitude to achieve navigational direction changes. For example, the altitude control system of the payload 220 may cause air to be pumped into a ballast within the envelope 210 which increases the mass of the aerial vehicle and causes the aerial vehicle to descend. Similarly, the altitude control system may cause air to be released from the ballast (and expelled from the aerial vehicle) in order to reduce the mass of the aerial vehicle and cause the aerial vehicle to ascend.

In both FIGS. 1 and 2, a tether 280 is attached to the aerial vehicle 200. The tether 280 may be attached to an anchor 290 or other object at ground level or on a ground surface of the Earth. This tether may be long enough to enable the aerial vehicle to ascend to altitudes where the aerial vehicle is able to pressurize while keeping the aerial vehicle from floating away.

Example Flight Termination System

As noted above, in order to enable an operator to terminate flight of a tethered aerial vehicle, a flight termination system may be used. FIGS. 3-6 are examples of a flight termination system 300, 400 and aerial vehicle 200. For ease of understanding, the relative sizes of and distances between aspects of the flight termination systems 300, 400, tether 280, aerial vehicle 200, wire 310, electrical cable 320, power supply 330, ground surface, etc. are not to scale.

Figure 3:
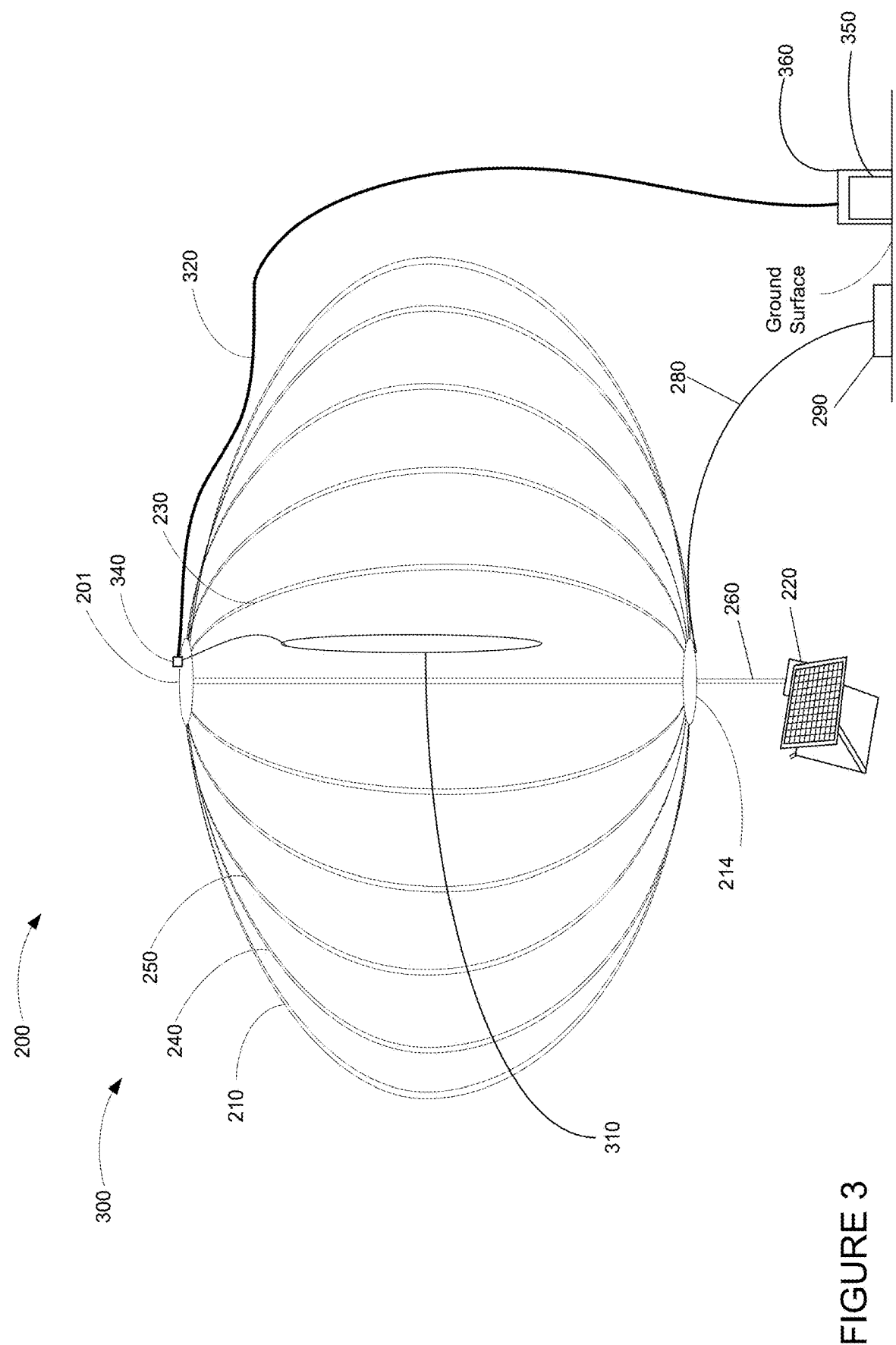
FIG. 3 is an example view of a flight termination system and envelope in accordance with aspects of the disclosure.
Figure 4:
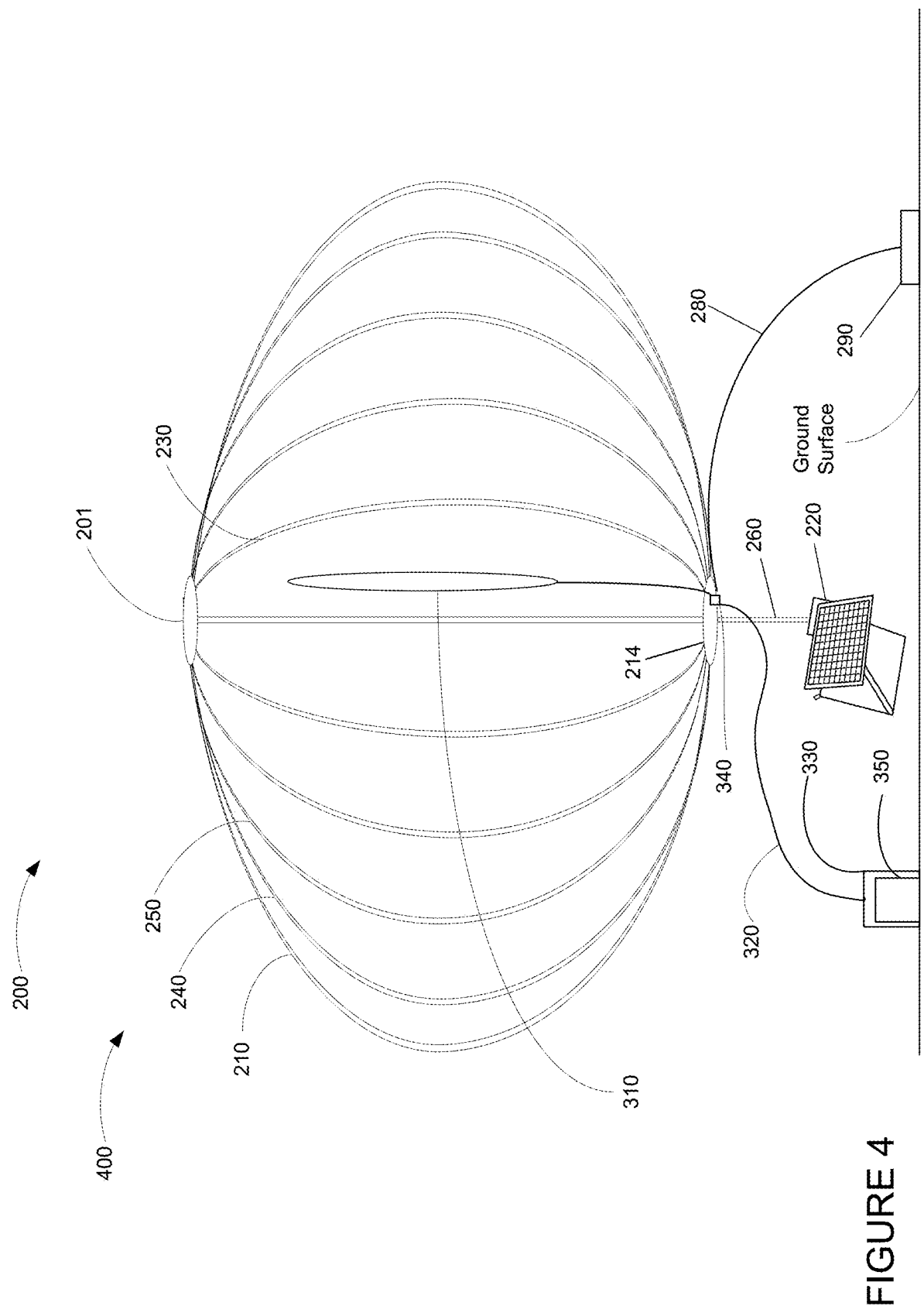
FIG. 4 is an example view of a flight termination system and envelope in accordance with aspects of the disclosure.

The flight termination systems 300, 400 may include a low resistance wire 310 as a heating element. The wire 310 may be attached to the envelope 210 to enable heat from the wire to melt envelope material of the envelope 210. For instance, as shown in FIGS. 3 and 4, the wire 310 may be arranged in a tight linear loop. The loop may be arranged at various other locations on the envelope such as around a top plate 201 or bottom plate 214 of the aerial vehicle. The configuration or shape of the wire 310 as arranged on the envelope may define the shape of the opening in the envelope created by heating up the wire. The wire may be attached or secured to the envelope material in various ways such as by heat sealing a piece of additional envelope material over the wire using a plurality of small tack points or two longer linear tack points for each side of the wire, tapes (such as packing tape or other adhesive tapes), etc.

The flight termination systems 300, 400 may also include an electrical cable 320 connected to both the wire 310 and a power supply 330 located remote from the aerial vehicle 200 at ground level or on the ground surface. The electrical cable 320 may be a 2-connector cable of an appropriate weight and gauge for use with the particular configuration of the aerial vehicle. For instance, if the electrical cable is too heavy, it may affect the ability of the aerial vehicle to reach a desired altitude for testing or other purposes. The electrical cable may be attached to or arranged separately from the tether 280 and several hundred feet long in order to reach the power supply on the ground.

In order to prevent the weight of the electrical cable 320 from pulling on the wire 310, the wire may be connected to the electrical cable via a strain relief connector attached to a top or base plate of the envelope. For instance, as shown in FIG. 3, the strain relief connector 340 is attached to the top plate 201. Alternatively, the strain relief connector could be attached to the bottom plate 214 as shown in FIG. 4. The power supply 330 may provide less than 100 volts, for instance 12-48 volts, in the form of direct current to the electrical cable 320. The power supply 330 may include a battery, gas powered motor, or other device capable of providing current to the electrical cable 320 and may be controlled by a control panel 350. The control panel 350 may include a user input, such as a touch-sensitive display or a button, which enables an operator to activate the power supply 330 and provide current to the electrical cable 320.

Figure 5:
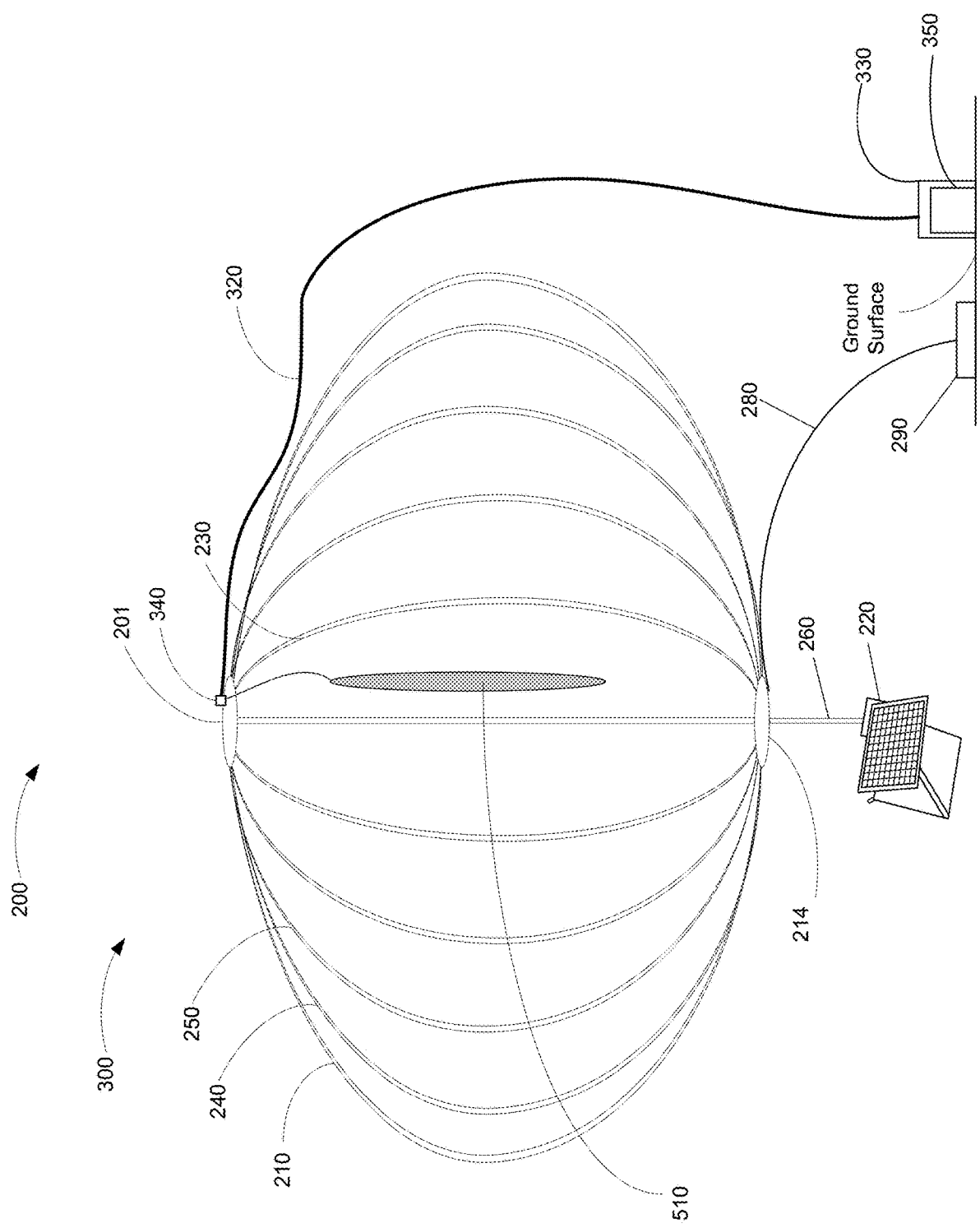
FIG. 5 is an example view of a flight termination system and envelope in accordance with aspects of the disclosure.
Figure 6:
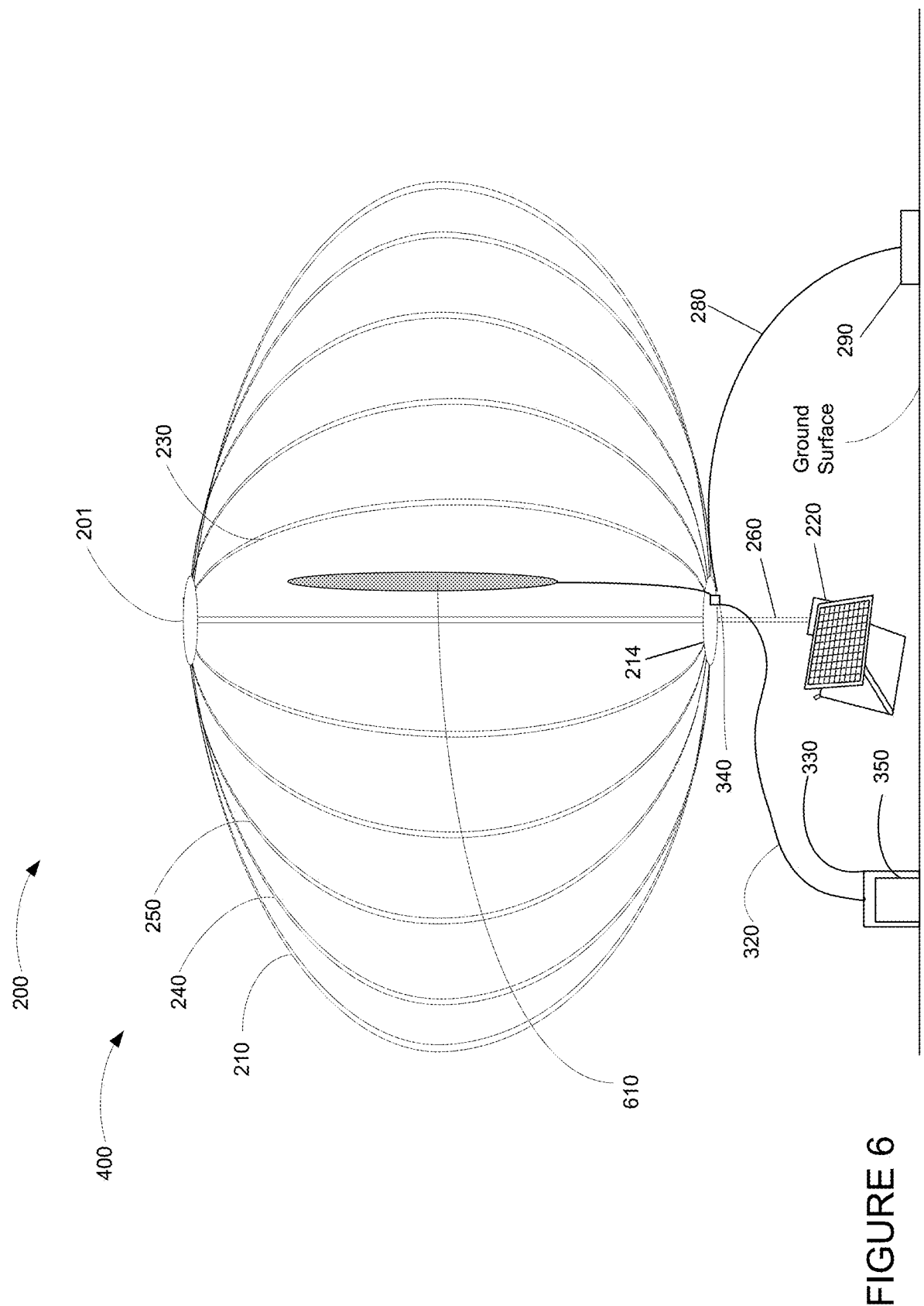
FIG. 6 is an example view of a flight termination system and envelope in accordance with aspects of the disclosure.
Figure 7:
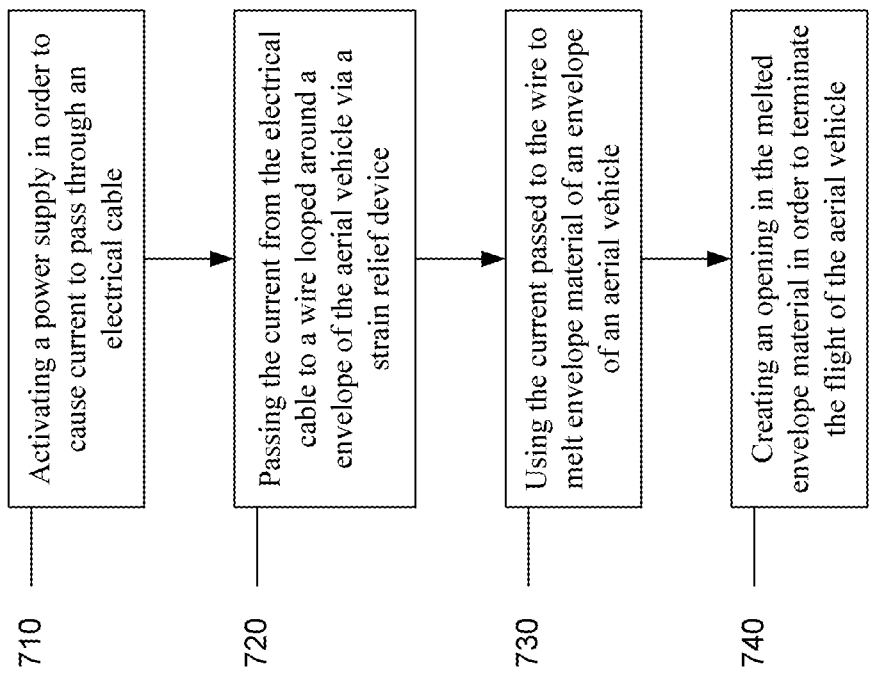
FIG. 7 is an example flow diagram in accordance with aspects of the disclosure.

Activating the power supply 330 may cause current to pass through the electrical cable 320, to the strain relief connector 340, and to the wire 310. The low resistance characteristics of the wire 310 may cause the wire 310 to heat up and melt the envelope material. The melting may not actually create an opening in the envelope. However, the force of the fluid on the interior of the envelope on the melted envelope material may cause an opening 510 or 610, as shown in FIGS. 5 and 6 (corresponding to flight termination systems 300 and 400, respectively), in the envelope material through which lift gas may escape. Again, the configuration or shape of the wire 310 may define the shape of the opening 510 or 610.

During use, the power supply 330 need only provide power for a few seconds. For instance, it may take only 5-10 seconds for the wire 310 to heat up and melt the envelope material. As such, after a predetermined period of time, such as 5-10 seconds, the power supply 330 may be shut off by an operator at the control panel 350 or automatically by a relay of the power supply.

At some point, enough lift gas will have escaped the envelope 210 that the aerial vehicle 200 will descend to the ground. For instance, if the diameter of the loop is relatively large as compared to the size of the envelope, for example, approximately 6 feet wide, the envelope may have lost almost all of its lift gas within 30 seconds. The wire 310 may have separated from the envelope material but may remain attached to the aerial vehicle 200 via the strain relief connector 340.

For example, FIG. 700 is an example flow diagram for terminating flight of a tethered aerial vehicle having an envelope, such as aerial vehicle 200 having envelope 210. In this example, at block 710 a power supply is activated in order to cause current to pass through an electrical cable. For example, power supply 330 may be activated via the control panel 350 in order to cause current to pass through the electrical cable 320. This current may correspond to providing less than 100 volts to the electrical cable. In some instances, as noted above, the power supply 330 may only be activated for a predetermined period of time sufficient to cause the envelope material of the envelope 210 to melt. At block 720, the current is passed from the electrical cable to a wire looped around an envelope of the aerial vehicle via a strain relief device. For example, the current may pass from electrical cable 320 to the wire 310 via the strain relief device 340. This strain relief device may also prevent the wire 320 from separating from the aerial vehicle 200 during this process (i.e. termination of the flight of the aerial vehicle. At block 730, the current passed to the wire may be used to melt envelope material of the envelope. For example, the current in the wire 310 may cause the envelope material of the envelope 210 to melt. At block 740, an opening may be created in the melted envelope material in order to terminate the flight of the aerial vehicle. For example, creating the opening 510 or 610 may include using lift gas forces within the envelope 210 to create the opening. In other words, the lift gasses are arranged within the envelope 210 to expand and cause a force on the envelope material.

The features described herein may enable termination of a flight of a tethered aerial vehicle in a simple and effective way. Terminating the flight of a tethered aerial vehicle can have significant safety implications. However, because the power supply is low voltage and high current, operators are less likely to be exposed to electrical hazards. In addition, because the opening in the envelope is created quickly and lift gas is able to escape quickly, the aerial vehicle is more likely to fall to the ground immediately in a more predictable way which may minimize risk to other objects around the aerial vehicle.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A system for a tethered aerial vehicle including an envelope, the system comprising:
   the envelope having an apex and a base below the apex;
   a tether connected to the aerial vehicle and an anchor at ground level; and
   a flight termination system including:

a wire heating element arranged in a loop around the envelope, and the wire heating element extends from proximate the apex to proximate the base;

a strain relief connector to which the wire heating element is connected; and an electrical cable connected to the strain relief connector, wherein the electrical cable is configured to provide current to the wire in order to melt envelope material of the envelope from proximate the apex to proximate the base and terminate a flight of the aerial vehicle.

2. The system of claim 1, wherein the electrical cable is long enough to reach a power supply remote from the aerial vehicle.

3. The system of claim 2, further comprising the power supply, wherein the power supply is configured to provide less than 100 volts direct current to the electrical cable.

4. The system of claim 3, wherein the power supply is configured to provide no more than 48 volts direct current to the electrical cable.

5. The system of claim 3, further comprising a control panel attached to the power supply, the control panel including a user input to enable an operator to activate the power supply and cause current to pass from the electrical cable to the wire.

6. The system of claim 3, wherein the power supply is configured to automatically shut off once the power supply has been activated for a predetermined period of time.

7. The system of claim 6, wherein the predetermined period of time is 10 seconds or less.

8. The system of claim 6, wherein the predetermined period of time is at least 5 seconds.

9. The system of claim 1, further comprising lift gas arranged to cause the envelope material to open once the envelope material has been melted.

10. The system of claim 1, wherein the strain relief connector is attached to a top plate of the envelope.

11. The system of claim 1, wherein the strain relief connector is attached to a bottom plate of the envelope.

12. The system of claim 1, wherein the strain relief connector is configured to keep the wire attached to the envelope during termination of the flight of the aerial vehicle.

13. The system of claim 1, further comprising an additional piece of envelope material arranged over the wire and heat sealed to the envelope in order to secure the wire to the envelope.

14. A method of terminating flight of a tethered aerial vehicle, the method comprising:

activating a power supply in order to cause current to pass through an electrical cable;

passing the current from the electrical cable to a wire looped around an envelope of the aerial vehicle via a strain relief device, the wire extending from proximate the apex to proximate the base of the envelope;

using the current passed to the wire to melt envelope material of the envelope; and creating an opening in the melted envelope material from proximate the apex to proximate the base in order to terminate the flight of the aerial vehicle while the aerial vehicle remains connected to a tether, the tether being connected to the aerial vehicle and an anchor at ground level.

15. The method of claim 14, further comprising, using the strain relief device to prevent the wire from separating from the aerial vehicle during the termination of the flight of the aerial vehicle.

16. The method of claim 15, wherein creating the opening includes using lift gas forces within the envelope to create the opening.

17. The method of claim 14, wherein activating the power supply includes doing so for a predetermined period of time.

18. The method of claim 14, wherein activating the power supply includes providing less than 100 volts to the electrical cable.

* * * * *